United States Patent Office 3,591,487
Patented July 6, 1971

3,591,487
HYDROCRACKING PROCESS IMPROVEMENT BY HIGH TEMPERATURE SULFIDING AND DRY GAS PROCESSING
Hans U. Schutt, Lafayette, Calif., assignor to Shell Oil Company, New York, N.Y.
No Drawing. Filed Dec. 22, 1969, Ser. No. 887,374
Int. Cl. C01g 13/02
U.S. Cl. 208—110
11 Claims

ABSTRACT OF THE DISCLOSURE

Hydrocracking catalysts which have been prepared by incorporating hydrogenation metal components into a hydrogel of a refractory oxide containing at least one Iron Group hydrogenation metal component and fluoride are greatly improved in activity and stability by sulfiding at a temperature of at least 750° F. and using relatively dry process gas.

BACKGROUND OF THE INVENTION

Field of the invention

This invention relates to the hydrocracking of hydrocarbon oils. In particular, it relates to an improvement in a hydrocracking process which uses a catalyst prepared by incorporating hydrogenation metal components into a hydrogel of a refractory oxide support.

Description of the prior art

In the hydroconversion of hydrocarbon fractions, catalysts are used which comprise a hydrogenation component on a suitable support such as silica, alumina, or mixtures thereof. The hydrogenation component is customarily supplied by a transition metal or metals, e.g., metals from Group VI–B and Group VIII. Particularly suitable metals are nickel, tungsten, cobalt, and molybdenum. The catalysts are conventionally prepared by impregnating the support with a solution or dispersion of a decomposable salt of the metal hydrogenation component, followed by calcination in air to convert the salt to metal oxide. The hydrogenation component can be employed as the metal, metal oxide, metal sulfide, or mixtures thereof.

It is known that a metal-fluoride catalyst in which the metal components are incorporated by reaction, e.g., ion-exchange, into a hydrogel of the refractory oxide support which is substantially free (usually less than 0.1% by weight) from sodium, is very effective in a hydrocracking process. This method incorporates the hydrogenation metal into the support in a complex reacted state. The role of fluoride in the hydrogel prepared composites is not fully understood but at least is believed to increase the acidity required for the cracking reaction. The interaction of the catalytic components with the hydrogel is considered to be the result of coordinate bonding which provides improved performance over catalysts in which the components are merely impregnated upon a precalcined support.

In this specification, a catalyst is called hydrogel-based, when the hydrogenation metal components are incorporated into a hydrogel of the base, which is then dried and calcined. A catalyst is called xerogel-based, when a hydrogel is dried and calcined first and the metal components are then impregnated into the dry base.

In general, the art teaches that sulfiding, i.e., conversion of the hydrogenation metal component to its sulfide form, can be accomplished by contacting the catalyst with hydrogen sulfide or organic sulfur compounds mixed with hydrocarbons, etc., at elevated temperatures. In general, with catalysts prepared by impregnating the hydrogenation metal component on a precalcined support, loss in catalyst activity can result if sulfiding is carried out at high temperatures. Temperatures above about 1200° F. are to be avoided because of possible sintering of the catalyst, loss of pore volume and crush strength, etc. On the other hand, the catalytic performance of a hydrogen-prepared catalyst can be markedly enhanced by a high temperature sulfiding treatment. Hydroconversion catalysts comprising an Iron Group metal (iron, cobalt, or nickel) either alone or in combination with a Group VI–B metal (chromium, molybdenum, or tungsten), which has been interacted with a hydrogel of a siliceous refractory oxide and fluoride are improved in activity when subjected to a sulfiding treatment at a temperature of at least about 750° F., preferably of 930° F. The enhanced performance of the catalyst apparently results from an interaction between sulfur, the metal ions, and the refractory oxide. The role of sulfur, incorporated in the catalyst composite at high temperatures, is considered to be that of a ligand in the complex structure which inhibits the aggregation of dispersed metal, thereby producing and preserving the number of integrated acidic (cracking) and hydrogenation catalytic sites.

SUMMARY OF THE INVENTION

It has now been discovered that the activity and stability of hydrogel-based catalysts are greatly improved when such catalysts are subjected to a sulfiding treatment at a temperature of at least about 750° F. until at least about 1% w. sulfur has been added to the catalyst and are used in the hydrocracking of hydrocarbon oils in the presence of hydrogen and less than about 1000 p.p.m.v., preferably less than about 750 p.p.m.v., water vapor. Higher initial activity of hydrogel-based catalysts is also realized when the sulfiding treatment is carried out with hydrogen-rich gas containing less than about 100 p.p.m.v. water vapor. It is essential to this invention that the catalyst be one comprising an Iron Group metal component and fluoride. It is preferred that the catalyst contain nickel as the Iron Group component. A catalyst which comprises nickel and a Group VI–B component, particularly molybdenum or tungsten, is also suitable.

A suitable catalyst is prepared by incorporating the hydrogenation components and fluoride into a hydrogel of an acid-acting refractory oxide. A silica-alumina catalyst base having good cracking activity is particularly suitable although other silica-containing refractory oxides may be used. These materials are primarily amorphous and are to be distinguished from the crystalline alumino-silicates.

DETAILED DESCRIPTION

Catalysts which are used in the present invention are prepared by incorporating an Iron Group metal alone or in combination with a Group VI–B metal into a hydrogel of a siliceous refractory oxide, e.g., silica-alumina. The siliceous hydrogel can be prepared in any conventional manner. For example, in the preparation of silica-alumina hydrogel, sodium silicate is reduced to about pH 9 by the addition of a mineral acid such as sulfuric acid, after which an aqueous solution of aluminum sulfate is added. The mixture is then neutralized with a base such as ammonium hydroxide. The hydrogel which forms is washed with, for example, acidulated water (e.g., demetallized water) or ammonium nitrate solution to remove undesirable ions such as sodium and sulfate. This method is generally referred to as "acid side" gelation. A suitable hydrogel can also be prepared by "base side" gelation. For example, an aqueous solution of sodium silicate is mixed with an aqueous solution of sodium aluminate. A mineral acid is added to the mixture to bring the pH to about 7. The resulting silica-alumina is suitably washed to remove undesirable ions such as sodium.

A particularly suitable cracking component is a siliceous refractory oxide containing from about 40 to 90% w. silica with the remainder, i.e., 60 to 10% w., being alumina, titania, magnesia, or the like. A silica-alumina catalyst base having good cracking activity comprises from about 60–90% w. silica and from about 40–10% w. alumina. Other acid-acting refractory oxides such as silica-alumina-zirconia, may also be used.

To achieve the advantages of the invention it is essential that at least one of the hydrogenation metal components be an Iron Group metal, preferebaly nickel, and that the catalyst contain fluoride. It is also essential that the hydrogenation metal be coordinated with the refractory oxide, i.e., by incorporation of the metal into a hydrogel substantially free from sodium. Hydrogenation components are incorporated into the catalyst by contacting the hydrogel with an aqueous cationic solution of metal salts, such as sulfate, nitrate or fluoride. Fluoride can be incorporated into the catalyst in any appropriate manner, for example, as the hydrogel is being formed, or in the solution of hydrogenative metal salts, using suitable fluoride compounds such as ammonium fluoride, ammonium bifluoride, HF, or other fluorides known to those skilled in the art. After incorporating the metal and fluoride components the hydrogel is generally washed with water to remove excess cations and anions and calcined in air or nitrogen at a temperature of about 800 to 1200° F.

In general, the catalyst will contain from about 0.1–25% w. of the Iron Group metal, from about 0.1–7% w. fluoride and, optionally, about 1–15 w. Group VI–B metal, based on the total weight of the catalyst. Particularly effective catalysts contain about 2% to 7% w. nickel. The catalyst may be in any physical form suitable for use in a hydroconversion operation, e.g., powders, granules, or extruded pellets.

The sulfiding treatment can be conducted in various ways as will be evident to those skilled in the art. Sulfiding can be effected by contacting the catalyst with sulfur or a sulfur-compound in hydrogen, preferably in hydrogen-rich gas comprising less than about 100 p.p.m.v. water vapor, at a temperature initially below 575° F. and raising the temperature to at least 750° F. where it should be maintained until about 1% w. sulfur has been added to the catalyst. Preferably, the temperature is raised to about 930° F. for at least one hour. Temperatures above 1200° F. should be avoided because of potential harm to the catalyst and process economics. Any sulfur compound which decomposes in the presence of hydrogen and the catalyst allowing the sulfur to be reacted with the catalyst is suitable. Sulfur compounds containing oxygen should be avoided to prevent water formation. Hydrogen sulfide is usually available, inexpensive and particularly suitable. Carbon disulfide and lower boiling mercaptans are further examples of suitable sulfur compounds.

While the concentration of the sulfiding gas is not critical, it is desirable to maintain the sulfur concentration (calculated as $H_2S$) below about 20% volume. It is especially preferred to use about 10% volume of $H_2S$ in hydrogen as the sulfiding gas. The purity of the gas stream is not critical so long as substantial amounts of hydrocarbons which produce coke or carbon on the catalyst and oxygen-containing compounds, which may form water, are not present. Preferably, the water content of the sulfiding gas is kept below 100 p.p.m.v., e.g., by employing a gas dryer to remove moisture, as this improves initial activity of the catalyst. Process recycle or plant hydrogen streams often available in a refinery are suitable. It is most appropriate, and especially preferred in a fixed bed process, that the sulfiding treatment be carried out in situ in the hydroconversion reactor vessel. The sulfiding treatment of the invention can be carried out at any desired pressure. It is often convenient, however, to conduct the sulfiding at elevated pressure to allow recycle of the sulfiding gas with the existing plant gas compressors and to achieve a relatively high mass flow rate required for good distribution and contact with the catalyst. A pressure in the range of about 500 p.s.i.g. is very suitable.

Hydrocracking processes of the invention are carried out generally at a temperature in the range from about 500 to 750° F., a hydrogen partial pressure of about 750 to 2000 p.s.i., and a liquid hourly space velocity (LHSV) from about 0.1 to 5 volumes of feed per hour per volume of catalyst. In practice, a hydrocracking process is generally designed for a low space velocity of about 0.5 to 2. During operation, a sulfur compound is desirably added to the feed to maintain the catalyst in its sulfided form. The sulfur may be a natural component in the feed or added to the feed. In general, conversion of hydrocarbons to lower boiling components increases as the temperature is increased or as the space velocity is decreased and declines as the catalyst becomes deactivated. Therefore, to maintain a relative constant conversion, it is necessary to increase the temperature periodically to compensate for any gradual loss of activity of the catalyst resulting from accumulation of carbonaceous deposits or catalyst poisons present in the feed. However, because of temperature or other limitations, the process must ultimately be discontinued to regenerate the catalyst by removing the carbonaceous deposits or poisons, such as by a controlled burning in dilute air. This invention is applicable to both fresh and regenerated catalysts.

Water vapor is usually present in a hydrocracking process in varying quantities. Water may be introduced into the process in the form of dissolved or entrained water along with the feed, as oxygen-containing compounds which are converted to water, or in the hydrogen-rich make-up or recycle gas streams resulting from treating the gases with aqueous solutions to remove impurities.

It is not required that the process gas be completely dry to achieve the improvements of this invention. For example, hydrocarbon feeds which contain dissolved water at about 75° F. and contain about 0.06% w. oxygen (from oxygen-containing compounds) would release enough water in the hydrocracking process to increase the water content of a dry hydrogen-rich gas to about 500 p.p.m.v., at typical hydrogen to oil ratios. This amount of moisture need not necessarily be removed to achieve the benefits of the invention. Hydrogen-rich make-up and recycle gases normally supplied to a hydrocracking process are generally cooled to about 110–130° F. at operating pressure and passed through a gas-liquid separator to remove condensable hydrocarbons. These gases generally contain about 700 to 1000 p.p.m.v. water vapor. The advantages of this invention can be realized by removing the moisture from the hydrogen-rich make-up and recycle gases so that the water content, including moisture derived from the liquid feed, is at least below 1000 p.p.m.v., preferably below 750 p.p.m.

The means used to reduce the moisture content of the process gas are immaterial and the moisture level required in practice will depend on process economics. The process gas water content can be reduced by such means as hydrotreating the feed to remove oxygen-containing compounds, drying the feed to remove entrained and dissolved water, or drying the make-up and/or the recycle gases to reduce the moisture content. Commercial gas dryers are available which generally utilize such drying agents as silica gel, molecular sieves, triethylene glycol, etc., to reduce the water content by about 90%. However, usually it will be adequate to supply hydrogen-rich make-up and recycle gases which contain less than about 100 p.p.m.v. water vapor.

PREFERRED EMBODIMENTS

In one embodiment of the invention a catalyst prepared as described above is placed in a suitable fixed bed reactor system and the temperature raised to about 930° F. at the rate of 50° F./hour while passing hydrogen-rich gas at a rate of at least 100 volumes/volume of catalyst/hour over the catalyst. When the temperature is above about 300° F. hydrogen sulfide is added to the hydrogen-rich gas to provide a volume ratio of about 1/10 with the hydrogen and continued until sufficient hydrogen sulfide has been added to give at least about 1% weight sulfur on the catalyst and the catalyst has been contacted for at least one hour at 930° F. The catalyst is then cooled to a temperature suitable for the introduction of hydrocarbon feed. The hydrogen-rich process gas is passed through a suitable gas dryer to remove most of the water of saturation. This combination of high temperature sulfiding and operation in a relatively dry system greatly improves catalyst activity and stability.

In an especially preferred embodiment of the invention the hydrogel-based catalyst is subjected to a high temperature precalcination treatment, e.g., 800–1200° F., and preferably above 900° F., before sulfiding. This precalcination is in addition to any calcination which may have been effected when the catalyst was first prepared. This treatment results in the removal of chemically bound water and other contaminants such as residual ammonia from the preparation of the catalyst. Apparently it also activates or modifies the refractory oxide chemical structure in such a way that sulfur is more easily and efficiently incorporated into the total complex. For example, the catalyst is placed in a suitable fixed bed reactor vessel and the temperature raised to about 930° F. at the rate of 50° F./hour while passing about 100–5000 volumes of dry non-reducing gas per volume of catalyst per hour over the catalyst. Any suitable non-reducing gas may be used for calcination so long as the gas used does not contain hydrocarbons which will leave carbon residue or catalyst poisons on the catalyst. Commercial nitrogen or dry air are preferred for the calcination treatment. The catalyst is held at 930° F. for a period of about 10 hours while the gas flow is continued. After calcination, the catalyst is cooled to less than about 575° F. and the non-reducing gas is replaced by a stream of H₂S in dry hydrogen. The temperature is raised at a rate of 50° F./hour and circulation is continued until sufficient hydrogen sulfide has been added to give at least about 1% weight sulfur on the catalyst and the catalyst has been contacted for at least one hour at 930° F. The catalyst bed is then cooled to a temperature suitable for the introduction of hydrocarbon feed, which is then processed in the presence of a hydrogen-rich gas which comprises less than about 750 p.p.m.v. water vapor.

Similarly, after regeneration of spent catalyst by burning off deposited carbon, the same procedure can be followed to activate the regenerated catalyst. However, a separate calcination is not required if the regeneration is carried out at appropriate calcination conditions.

The following examples illustrate the practice and advantages of the invention.

Example I

To demonstrate the advantages of relatively dry hydrogen-rich gas on the stability of a sulfied hydrogel-based catalyst, nickel, tungsten and fluoride were incorporated into a substantially sodium-free hydrogel of silica-alumina. The amorphous refractory oxide was prepared by the acid-side gelation method and contained about 77% w. silica and 23% w. alumina. The finished catalyst contained about 4.9% w. Ni, 3.1% w. W, and 3.4% w. F.

The composite was dried and calcined in air at 930° F. for 10 hours and stored at ambient conditons. Prior to use the catalyst was sulfided by contact with a stream of dry 20% v. H₂S-in-hydrogen at 100 p.s.i. while raising the temperature from 390° F. to 930° F. at the rate of 40° F./hour. Sulfiding was continued at the final temperature for about 6 hours.

This catalyst was divided into two portions and used to hydrocrack a 40/60 mixture of catalytically cracked light and heavy gas oils having a 27° API gravity and a boiling range of about 480–750° F. which had been hydrotreated to a nitrogen content of 3–4 p.p.m. This feedstock contained 0.04% w. oxygen. Hydrocracking conditions were: 1800 p.s.i.g., 1.0 LHSV, 10/1 hydrogen-to-oil molar ratio and 1.25 combined feed ratio. One portion (Catalyst A) was used with a hydrogen-rich process gas which was saturated with water at 110° F. The second portion (Catalyst B) was treated identically except the process gas was essentially moisture-free before being used in the process. The temperature was increased as required to convert 80% of the feedstock to products boiling less than 390° F. The results were as follows:

TABLE 1

| | Temperature required for 80% conversion to products boiling <390° F. | |
|---|---|---|
| | Catalyst A | Catalyst B |
| Days onstream: | | |
| 4 | 527 | 565 |
| 10 | 600 | 583 |
| 20 | 651 | 611 |
| 30 | 662 | 639 |
| 40 | 670 | 643 |
| 50 | 677 | 652 |
| 60 | 682 | 655 |
| 75 | 690 | 657 |

These data show that the catalyst used under relatively dry process conditions (Catalyst B) is more active initially, as indicated by the 7° F. lower temperature required at five days onstream, and is more stable as indicated by the lower temperature increase rate. The catalyst used under relatively wet processing conditions (Catalyst A) reached a temperature of 690° F. in 75 days, while Catalyst B was still very stable as indicated by the relatively low temperature required (657° F.) and by the low rate at which the temperature requirement increased after 75 days.

Example II

This example is to illustrate that a preferred method of operation results where the hydrogel-based catalysts of the invention are sequentially calcined, cooled and sulfided prior to use in a relatively dry hydrocracking process. A catalyst was prepared by incorporation of nickel, tungsten, and fluoride into a substantially sodium-free hydrogel of silica-alumina. The composite was then dried and calcined in air at 930° F. The finished catalyst contained 2.6% w. Ni, 3.1% w. W, and 2.2% w. F. Following calcining the catalyst was stored at ambient conditions.

Prior to use one portion of the catalyst (Catalyst C) was sulfied by contact with a stream of dry 10% v. H₂S-in-hydrogen while raising the temperature from 390° F. to 930° F. at a rate of 50° F./hour. Sulfiding continued at the higher temperature for about two hours. Another portion of the same catalyst (Catalyst D) was precalcined in air for 10 hours at 930° F., cooled to 390° F. and sulfied in the same manner except sulfiding was continued at the higher temperature for about six hours.

These catalysts were used to hydrocrack a mid-continent catalytically cracked heavy gas oil (30° API; boiling range about 450 to 750° F.). The gas oil had been pretreated to reduce the nitrogen content to about 3 p.p.m. The feedstock contained 0.08% w. oxygen. The hydrocracking conditions were: 1500 p.s.i.g.; 0.67 LHSV and 10/1 hydrogen-to-oil molar ratio. The process gas used was essentially water-free before being routed to the process.

Catalyst activity was measured by the temperature required to maintain a constant conversion of 67% of the feedstock to products boiling lower than 390° F. after 80 hours operation at test conditions. After the test period Catalyst C which had not been precalcined required a temperature of 556° F. while Catalyst D which had been precalcined required a temperature of only 540° F. to achieve the same conversion. This 16° F. activity advantage is doubly important since it not only allows initially lower heating costs, but also allows a longer processing period before regeneration and/or allows a higher space velocity to be used. Although these catalysts were sulfided for different periods, previous tests have shown that the activity is essentially unaffected by the sulfiding period above 930° F. as long as the sulfiding is continued for at least one hour.

Example III

To demonstrate the activity advantage of using a relatively dry gas for sulfiding, part of the calcined catalyst of Example I was divided into two portions. One portion (Catalyst E) was sulfided by heating the catalyst to 930° F. at the rate of 40° F./hour and contacting with a stream of dry $H_2S$-in-hydrogen ($H_2S$ partial pressure about 25 p.s.i.) at this temperature for six hours. The second portion (Catalyst F) was sulfided in a similar manner except that the sulfiding gas was saturated with water at 110° F.

These catalysts were then tested for activity in an 80-hour test using the feedstock and operating conditions described in Example II. After 80 hours Catalyst E had a temperature requirement of 518° F. to convert 67% of the feedstock to products boiling less than 390° F. while Catalyst F required a temperature of 541° F. Thus, Catalyst E which was sulfided with dry gas was 23° F. more active than Catalyst F which was sulfided with relatively wet gas. This initial advantage is soon lost, however, unless the processing operation is continued with a hydrogen-rich gas which is relatively dry.

I claim as my invention:

1. In the hydrocracking of hydrocarbons using a hydrogel-based catalyst comprising about 0.1–25% w. Iron Group metal, 0.1–7% w. fluoride and an amorphous siliceous refractory oxide cracking support, the improvement which comprises activating the catalyst by first sulfiding at a terminal temperature of at least 750° F. until at least about 1% w. sulfur has been deposited and then using said catalyst in a hydrocracking process in the presence of less than about 1000 p.p.m.v. water.

2. The improvement of claim 1 wherein the catalyst sulfiding is effected in the presence of less than about 100 p.p.m.v. water.

3. The improvement of claim 1 wherein the catalyst is sequentially calcined in a non-reducing gas at a temperature of about 800–1200° F. and cooled to less than about 575° F. before sulfiding.

4. The improvement of claim 1 wherein the catalyst contains about 1–15% w. Group VI–B metal.

5. The improvement of claim 4 wherein the Group VI–B metal is tungsten.

6. The improvement of claim 1 wherein the refractory oxide is silica-alumina and the Iron Group metal is nickel.

7. The improvement of claim 6 wherein the catalyst is calcined in a non-reducing gas at a temperature of about 800 to 1200° F., cooled to less than about 575° F., and then sulfided in the presence of less than about 100 p.p.m.v. water.

8. The improvement of claim 1 wherein the catalyst has previously been deactivated in the hydrocracking of hydrocarbons, and subjected to controlled burning in dilute air to effect carbon removal.

9. The improvement of claim 1 wherein the refractory oxide is silica-alumina cracking catalyst, the silica-alumina is sequentially calcined in a non-reducing gas at 800 to 1200° F., cooled to less than 575° F., and then sulfided in the presence of less than about 100 p.p.m.v. water.

10. The improvement of claim 9 wherein the Iron Group metal is nickel and the catalyst contains about 1–15% w. Group VI–B metal.

11. The improvement of claim 10 wherein the Group VI–B metal is tungsten.

References Cited
UNITED STATES PATENTS

| | | | |
|---|---|---|---|
| 2,405,408 | 8/1946 | Connolly | 208—120 |
| 3,213,012 | 10/1965 | Kline et al. | 208—111 |
| 3,458,433 | 7/1969 | Wood et al. | 208—111 |

DELBERT E. GANTZ, Primary Examiner

R. M. BRUSKIN, Assistant Examiner

U.S. Cl. X.R.

208—111; 252—439